United States Patent
Potter et al.

(10) Patent No.: US 9,242,671 B2
(45) Date of Patent: Jan. 26, 2016

(54) SELF TUNING UNIVERSAL STEERING CONTROL SYSTEM, METHOD, AND APPARATUS FOR OFF-ROAD VEHICLES

(71) Applicant: Deere & Company, Moline, IL (US)

(72) Inventors: Matthew D. Potter, Moorhead, MN (US); Tyler D. Schleicher, Ankeny, IA (US); Nanjun Liu, Urbana, IL (US); Andrew G. Alleyne, Urbana, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/609,106

(22) Filed: Jan. 29, 2015

(65) Prior Publication Data
US 2015/0142270 A1 May 21, 2015

Related U.S. Application Data

(62) Division of application No. 13/601,691, filed on Aug. 31, 2012, now Pat. No. 9,139,222.

(60) Provisional application No. 61/617,913, filed on Mar. 30, 2012.

(51) Int. Cl.
*B62D 15/02* (2006.01)
*B62D 6/00* (2006.01)
(Continued)

(52) U.S. Cl.
CPC ...... *B62D 15/02* (2013.01); *B62D 6/00* (2013.01); *G05D 1/0278* (2013.01); *G06F 7/00* (2013.01);
(Continued)

(58) Field of Classification Search
CPC ... B60W 10/06; B60W 10/184; B60W 10/08; B60W 10/11; A01B 69/003; B60K 28/165; B60R 1/00; B60T 2201/04; B62D 15/025; C23C 14/35; E02F 9/26; F16F 15/02; F16H 61/0213; G01C 21/26; G01S 19/32; G05B 19/19; G06F 17/30241; G10K 11/178; H01J 37/3408; H01Q 1/32; H02P 6/16; H04B 7/0814

USPC ............. 701/41, 42, 44, 48, 69, 87, 408; 343/712; 204/192.12; 345/156; 318/621; 381/71.4

See application file for complete search history.

(56) References Cited

U.S. PATENT DOCUMENTS 4,811,025 A * 3/1989 Ohe ............... H01Q 1/32
    343/712
5,593,551 A * 1/1997 Lai ............... C23F 14/35
    204/192.12

(Continued)

FOREIGN PATENT DOCUMENTS

DE    10254392 A1   5/2004
EP     1916584 A2   4/2008

OTHER PUBLICATIONS

International Search Report and Written Opinion dated Apr. 17, 2014.

(Continued)

*Primary Examiner* — James Trammell
*Assistant Examiner* — Sanjeev Malhotra
(74) *Attorney, Agent, or Firm* — Harness, Dickey & Pierce

(57) ABSTRACT

At least one example embodiment discloses a method of controlling steering of a vehicle. The method includes identifying a reduced-order vehicle model, the reduced-order vehicle model representing a vehicle transfer function in which a least one high-frequency pole is removed. The method further includes generating target closed loop pole locations based on at least one user preference parameter. The method further includes determining calibration parameters that place closed loop poles of a composite system at the target closed loop poles. The composite system in this context includes the reduced-order vehicle model and a steering control system. Finally, the method includes controlling the steering using the steering control system configured using the calibration parameters.

9 Claims, 10 Drawing Sheets

(51) Int. Cl.
*G05D 1/02* (2006.01)
*G06F 7/00* (2006.01)
*G07C 5/08* (2006.01)
*B60W 10/20* (2006.01)
*B60W 50/00* (2006.01)

(52) U.S. Cl.
CPC .............. *G07C 5/0808* (2013.01); *B60W 10/20* (2013.01); *B60W 2050/0031* (2013.01); *B60W 2050/0088* (2013.01); *G05D 2201/0201* (2013.01)

(56) References Cited

U.S. PATENT DOCUMENTS

| | | | | |
|---|---|---|---|---|
| 2002/0022916 A1* | 2/2002 | Akita | ................... | B62D 7/159 701/42 |
| 2002/0040269 A1* | 4/2002 | Billig | ................... | B60K 29/165 701/87 |
| 2003/0128182 A1* | 7/2003 | Donath | ................... | B60R 1/00 345/156 |
| 2008/0091343 A1* | 4/2008 | Hill | ................... | E02F 9/26 701/408 |
| 2008/0249690 A1* | 10/2008 | Matsumoto | ........... | B60W 10/06 701/48 |
| 2009/0284208 A1* | 11/2009 | Ikeda | ................... | H02P 6/16 318/621 |
| 2009/0299573 A1* | 12/2009 | Thrun | ................... | B62D 15/025 701/41 |
| 2010/0023222 A1* | 1/2010 | Chiocco | ............... | A01B 69/003 701/44 |
| 2010/0100295 A1* | 4/2010 | Inoue | ................... | B60W 10/06 701/69 |
| 2012/0070013 A1* | 3/2012 | Vau | ...................... | G10K 11/178 381/71.4 |
| 2013/0179036 A1* | 7/2013 | Lee | ................... | B62D 15/0255 701/41 |

OTHER PUBLICATIONS

PCT International Preliminary Report on Patentability for PCT/US2013/030503 dated Oct. 9, 2014.

* cited by examiner

SELF TUNING UNIVERSAL STEERING CONTROL SYSTEM, METHOD, AND APPARATUS FOR OFF-ROAD VEHICLES

PRIORITY INFORMATION

This application is a divisional application of U.S. application Ser. No. 13/601,691, filed Aug. 31, 2012, which claims priority under 35 U.S.C. 119 to provisional application No. 61/617,913 filed Mar. 30, 2012; the entire contents of each of which are hereby incorporated by reference.

FIELD

Example embodiments relate to a method and system for calibrating a steering control system adaptable for multiple off-road vehicle platforms.

BACKGROUND

Global Positioning Systems (GPS's) are widely used in vehicle systems. Agricultural tractors use GPS's, for example, to implement automatic steering through pre-defined routes within agricultural fields.

Performance of automatic steering systems may be degraded for so-called retrofit systems that effectively bolt on to existing vehicles. Vehicle configurations and soil type and conditions may also degrade automatic steering performance. A vehicle lateral dynamics model identification can be derived based on vehicle parameter estimations, and this model can be used to develop a steering controller that may overcome some above the aforementioned degradations of performance. However, vehicle parameters are hard to measure and are not always accessible. A sinusoidal sweep method may also be used for open-loop vehicle lateral dynamics model identification. With this method, a set of sinusoidal tests within a range of frequencies are analyzed to determine the system's frequency response. This open loop sinusoidal sweep approach may not be ideal in agricultural settings due to the limited area available to perform the necessary tests. Closed loop identification is considered more appropriate for farm vehicle identification.

SUMMARY

At least one example embodiment uses a closed loop identification method for farm vehicle identification and modeling. Example embodiments utilize Iterative Learning Identification (ILI) to identify a vehicle model. Using this vehicle model to account for vehicle configurations, soil type, soil conditions, etc., a better control system is developed for providing robust control of an automatic steering system.

Any vehicle model may be expressed as a reduced-order transfer function. A transfer function in this context is a mathematical expression relating one function of a vehicle to another function of the vehicle. A typical vehicle model may be expressed as a fourth-order transfer function. Because agricultural vehicles usually operate in a relatively low frequency range, high-frequency poles of a typical vehicle transfer function may be truncated or ignored, and a vehicle model representing an agricultural vehicle may thus be represented as a second-order transfer function. This greatly reduces the complexity of mathematical functions and reduces computing power necessary to calculate controller calibration constants. The inventors have recognized that these calculations may therefore be performed in a compact unit on an agricultural vehicle, for example. Thus, the inventors have discovered that ILI may be performed on an agricultural vehicle in real-time to develop a vehicle model. The vehicle model may be used to calculate controller calibration constants for real-time control of vehicle systems.

At least one example embodiment discloses a method of controlling steering of a vehicle. The method includes identifying a reduced-order vehicle model, the reduced-order vehicle model representing a vehicle transfer function in which a least one high-frequency pole is removed. The method further includes generating target closed loop pole locations based on at least one user preference parameter. The method further includes determining calibration parameters that place closed loop poles of a composite system at the target closed loop poles. The composite system in this context includes the reduced-order vehicle model and a steering control system. Finally, the method includes controlling the steering using the steering control system configured using the calibration parameters.

In one example embodiment, the at least one user preference parameter includes at least a steering aggressiveness level.

In one example embodiment, the reduced-order vehicle model includes two poles.

In one example embodiment, the method further includes evaluating the performance of the steering control system based on at least one performance criterion. The method further includes updating the reduced-order vehicle model based on the evaluating. Finally, the method further includes determining updated calibration parameters based on the updated reduced-order vehicle model.

In one example embodiment, the performance criteria include a at least a settling time and a maximum overshoot of the reduced-order vehicle model.

In one example embodiment, performance criteria further include target standard deviations for lateral position error of the steering and heading angle error of the steering and the performance criteria are satisfied if an observed settling time is less than or equal to the target settling time and an observed maximum overshoot is less than or equal to a maximum target overshoot.

In one example embodiment, the evaluating evaluates at least an aggregate lateral position error of the steering and an aggregate heading angle of the steering.

In one example embodiment, the evaluating further includes determining, by a location-determining receiver, a plurality of pairs of actual observed positions and corresponding observed headings of the vehicle along the defined course in the work area. The evaluating further includes determining a lateral position error between each of the actual observed positions and a corresponding target position on the course. The evaluating further comprises determining each heading angle error of the vehicle between each of the actual observed heading angles and a target heading angle of the vehicle on the course. The evaluating further includes estimating an aggregate lateral position error based on the determined lateral position errors. The evaluating finally includes estimating an aggregate heading error based on the determined errors.

In one example embodiment, the method is initiated based on user input.

In one example embodiment, the method is initiated based on initial installation of a steering control system.

At least one example embodiment discloses a method for calibrating control parameters of an off-road vehicle system. The method includes identifying a reduced-order vehicle model. The reduced-order vehicle model represents a vehicle transfer function in which at least one high-frequency pole is removed. The method further includes generating target closed loop pole locations based on at least one user preference parameter. The method further includes determining calibration parameters that place closed loop poles of a composite system at the target closed loop poles. The composite system includes the reduced-order vehicle model and a vehicle control system. The method further includes controlling the off-road vehicle using the vehicle control system configured using the calibration parameters.

In one example embodiment, the reduced-order vehicle model includes two poles.

In one example embodiment, the method further includes evaluating the performance of the vehicle control system based on at least one performance criterion. The method further includes updating the reduced-order vehicle model based on the evaluating. The method finally includes determining updated calibration parameters based on the updated reduced-order vehicle model.

In one example embodiment, the method is initiated based on user input.

In one example embodiment, the method is initiated based on initial installation of a vehicle control system.

At least one example embodiment discloses a system for controlling steering of a vehicle. The system includes a processor and an associated memory. The processor is configured to identify a reduced-order vehicle model. The reduced-order vehicle model represents a vehicle transfer function in which at least one high-frequency pole is removed. The processor is further configured to generate target closed loop pole locations based on at least one user preference parameter. The processor is also configured to determine calibration parameters that place closed loop poles of a composite system at the target closed loop poles, the composite system including the reduced-order vehicle model and a steering control system. The system further includes a motor configured to control the steering using the steering control system configured using the calibration parameters.

In one example embodiment, the at least one user preference parameter include at least a steering aggressiveness level.

In one example embodiment, the reduced-order vehicle model includes two poles.

In one example embodiment, the processor is further configured to evaluate the performance of the steering control system based on at least one performance criterion. The processor is further configured to update the reduced-order vehicle model based on the evaluating. The processor is further configured to determine updated calibration parameters based on the updated reduced-order vehicle model.

In one example embodiment, the performance criteria include at least a settling time and a maximum overshoot of the reduced-order vehicle model.

In one example embodiment, the performance criteria further include target standard deviations for lateral position error and heading angle error. The performance criteria are satisfied if an observed settling time is less than or equal to the target settling time and an observed maximum overshoot is less than or equal to a maximum target overshoot.

In one example embodiment, the processor evaluates at least an aggregate lateral position error of the steering and an aggregate heading angle error of the steering.

In one example embodiment, the system further includes a location-determining receiver. The location-determining receiver is configured to determine a plurality of pairs of actual observed positions and corresponding observed headings of the vehicle along the defined course in the work area. The processor is further configured to determine a lateral position error between each of the actual observed positions and a corresponding target position on the course. The processor is further configured to determine each heading angle error of the vehicle between each of the actual observed heading angles and a target heading angle of the vehicle on the course. The processor is further configured to estimate an aggregate lateral position error based on the determined lateral position errors. The processor is further configured to estimate an aggregate heading error based on the determined errors.

At least one example embodiment discloses a vehicle control system. The vehicle control system includes a processor and an associated memory. The processor is configured to identify a reduced-order vehicle model. The reduced-order vehicle model represents a vehicle transfer function in which at least one high-frequency pole is removed. The processor is further configured to generate target closed loop pole locations based on at least one user preference parameter. The processor is further configured to determine calibration parameters that place composite system closed loop poles at the target closed loop poles. The composite system includes the reduced-order vehicle model and a vehicle control system. The vehicle control system further includes a device configured to control a function of the vehicle using the vehicle control system, the vehicle control system being based on the determined calibration parameters.

In one example embodiment, the reduced-order vehicle model includes two poles.

In one example embodiment, the processor is further configured to evaluate the performance of the vehicle control system based on at least one performance criterion. The processor is further configured to update the reduced-order vehicle model based on the evaluating. The processor is further configured to determine updated calibration parameters based on the updated reduced-order vehicle model.

In one example embodiment, the processor is further configured to receive a user input indicate acceptance of performance of the vehicle control system.

In one example embodiment, the performance criteria include at least a settling time and a maximum overshoot of the reduced-order vehicle model.

BRIEF DESCRIPTION OF THE DRAWINGS

Example embodiments will be more clearly understood from the following detailed description taken in conjunction with the accompanying drawings.

FIG. 1 illustrates a system for controlling steering of a vehicle according to an example embodiment;

FIG. 2 illustrates an example embodiment of a controller for controlling, for example, steering of a vehicle;

FIG. 3 illustrates a root locus diagram of a typical fourth order vehicle model and a reduced-order vehicle model according to an example embodiment;

FIG. 4 illustrates a Bode diagram of a typical fourth-order vehicle model and a reduced-order vehicle model according to an example embodiment;

FIG. 5 illustrates an example embodiment of a method for controlling a vehicle;

FIG. 6 illustrates a steering test for identifying a simplified vehicle model according to an example embodiment;

FIG. 7 illustrates an architecture for implementing and storing results of steering tests according to an example embodiment;

FIG. 8 illustrates a method for identifying a simplified vehicle model according to an example embodiment;

FIG. 9 illustrates closed loop architecture for implementing Iterative Learning Identification (ILI) according to an example embodiment;

FIG. 10 illustrates a method for generating target poles according to an example embodiment; and FIG. 11 illustrates a method for determining calibration parameters according to an example embodiment.

DETAILED DESCRIPTION

Figure 1:
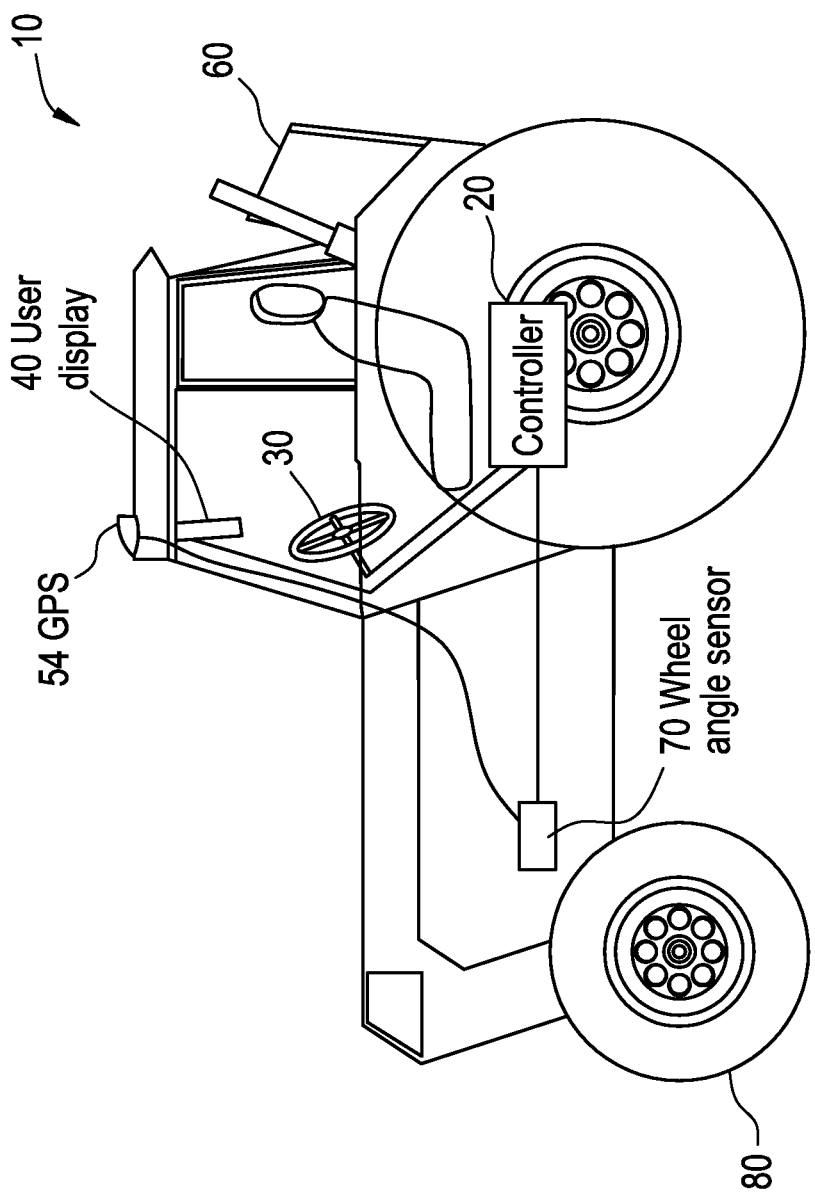
FIGS. 1-11 represent non-limiting, example embodiments as described herein.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access.

FIG. 1 illustrates a system 10 in which at least one example embodiment is implemented. The system includes a controller 20 for implementing calibration and control of at least one vehicle system. Features of the controller 20 are described in further detail with regard to FIG. 2.

The system 10 further includes a steering system 30. The controller 20 may be integrated into a structure of the steering system 30 in example embodiments. In at least another example embodiment, the controller 20 may be separate from the steering system 30. It should be understood that the controller 20 may be used to control any steering system installed by a vehicle owner, dealer, or other party.

The steering system 30 may be an electrical steering system, a drive-by-wire steering system, an electro-hydraulic steering system, or a hydraulic steering system with an electronic control interface. An electrical steering system or a drive-by-wire steering system may include an electric motor or actuator that is mechanically coupled to rotate or steer at least one wheel of the vehicle 60. An electro-hydraulic steering system may control a hydraulic valve, a hydraulic cylinder or another hydraulic member via a solenoid or another electromechanical device to steer the vehicle 60 or execute a turn.

The system 10 further includes a user display 40. The user display 40 may display any features or parameters of the vehicle 60, including, for example, speed and heading information. The user display 40 may comprise a keyboard, a keypad, a touch-screen display, a pointing device, a switch, a console, or a dashboard, for example. The user display 40 may be used to enter user preference parameters described in further detail below.

The system 10 further includes a location-determining receiver 50 to determine the position of the vehicle 60. The location-determining receiver may be, for example, a Global Positioning System (GPS) receiver. The location-determining receiver 50 may provide one or more of the following data types: position data (e.g., expressed as geographic coordinates), velocity data, and acceleration data. Velocity data further comprises speed data and heading data for the vehicle 60. The aforementioned data may further be displayed on the user display 40.

The system 10 further includes at least one wheel angle sensor 70 measuring the steering angle of at least one wheel 80.

The lines that are interconnecting the aforementioned devices may be physical data paths, logical data paths, or both. Physical data paths are defined by transmission lines or data buses. Data buses may be, for example, Control Area Network (CAN) buses. Logical data paths may comprise logical or virtual communications that take place within software or between software modules.

Figure 2:
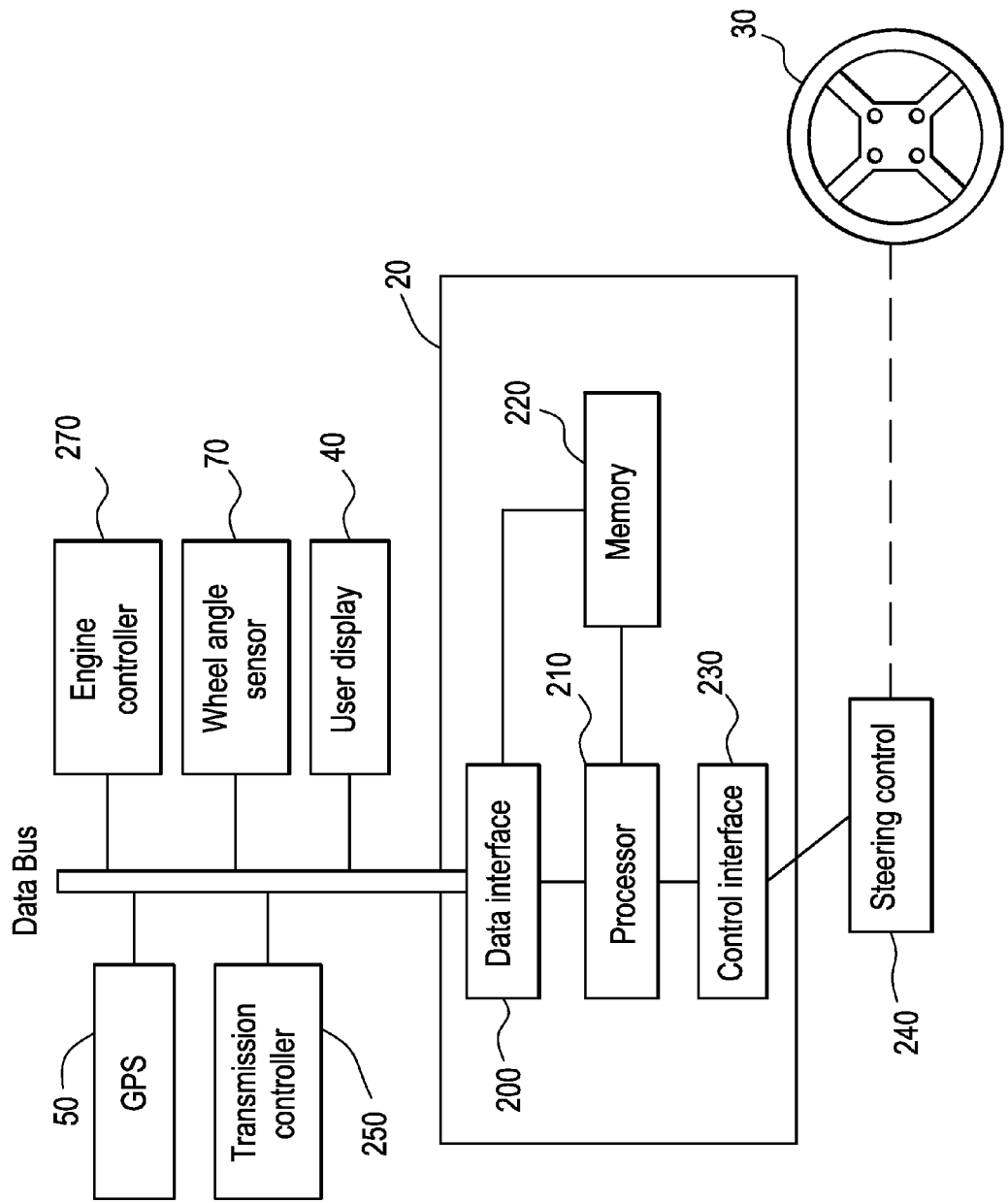

FIG. 2 illustrates an example embodiment of the controller 20. The controller 20 includes a data interface 200 for interfacing with other systems of the vehicle 60. In example embodiments, the data interface 200 communicates over a data bus connected to the user display 40 and/or to the location-determining receiver 50 and/or the wheel angle sensor 70. The data interface 200 may connect to other devices or sensors of the vehicle including, for example, electronic control units (ECU's), which may include, for example, a transmission controller 250 and an engine controller 270. It should be understood that these examples are non-limiting and there may be any number of controllers and/or sensors providing data to the data interface 200 over the data bus.

The data interface 200 may receive messages containing further data from any ECU such as, for example, the transmission controller 250, engine controller 270 or other controller of the vehicle connected on the data bus. The messages may be implemented using a protocol such as, for example, Control Area Network (CAN). The messages may contain data including operational parameters or other parameters related to the vehicle 60 provided by, for example, temperature gauges, magnetic wheel speed sensors, traction control sensors, etc.

The data interface 200 relays data to or from the processor 210 and at least one memory 220. The processor 210 implements algorithms and other functionality of the controller 20 described in further detail below.

The processor 210 may be any type of processor configured to execute program codes stored in the at least one memory 210. The memory 210 may be any type of memory such as Random-Access Memory (RAM) and/or Read-Only Memory (ROM), for example. The processor 210 outputs results of algorithms and other functionality of the controller 20 to the control interface 230. The processor 210 may send an analog control signal or a digital control signal to the control interface 230.

The control interface 230 provides the signals to steering control 240. For example, the control interface 230 may provide signals including CAN messages to a steering control 240. The messages may include, for example, commands such as steering angle commands or position data.

In at least one embodiment, the steering control 240 may be a motor, for example, a servo motor. The steering control 240 may be incorporated in a housing attached to the steering wheel 30 and the steering control 240 may be coupled to the steering wheel 30 such that the controller 20 controls operation of the steering wheel 30 and thus steering of the vehicle through the steering control 240. As described above with regard to FIG. 1, the controller 20 may also be incorporated in this housing.

In at least another example embodiment, the steering control 240 may include valves, for example hydraulic valves, for causing movement of at least one vehicle wheel 80, and the control interface 230 provides an electrical current for operating the valves. In at least this embodiment, the steering control 240 is not incorporated in the housing of the steering wheel 30.

It should be understood, however, that the controller 20 may provide control outputs through a control interface 230 to other types of vehicle systems such as, for example, a braking system. Example embodiments are not limited to providing control of a steering system 30.

Mathematical Model

To better understand the example embodiments, first a mathematical model of a vehicle will be described.

As is known, a mathematical model may be developed to describe the motion of vehicles. A typical vehicle model for describing vehicle motion can be expressed using a fourth-order transfer function from a front wheel steering angle, u(s), to a lateral output, y(s). As is known, a transfer function is a mathematical expression relating the input to the output of a system. As is also known, a pole of a transfer function is a value at which the transfer function equals infinity. In other words, a pole is a value for which the denominator of the transfer function is zero. A zero of a transfer function is a value at which the transfer function equals zero. In other words, a zero is a value for which the numerator of the transfer function is zero. The order of a transfer function equals the number of poles of the transfer function.

The fourth-order transfer function, described above, may be developed using vehicle parameters such as, for example, longitudinal velocity, vehicle mass, and center of gravity.

A vehicle model G(s), calculated using typical values for the aforementioned vehicle parameters, may be expressed as:

$$G(s) = 62.3202 \frac{(s + 8.3455)(s + 1.7497)}{s^2(s + 39.2902)(s + 10.8859)} \quad (2)$$

where s is a complex frequency variable. The calculation steps are known and are omitted for brevity. As can be seen, there are four poles in the model above (the $s^2$ term counts as two poles) and therefore the transfer function is a fourth-order transfer function.

The inventors have noted that agricultural vehicles usually operate in a relatively low frequency range as compared to on-highway vehicles. Examining equation (2), it can be seen that the example fourth-order vehicle model has two poles (−39.2902, −10.8859) and one zero (−8.3455), which characterize dynamics at least four times faster than the other poles (0,0) and zeros (−1.7497). Therefore, the fourth order model in (2) can be further simplified by truncating the high frequency poles and zeros to generate a second-order formulation:

$$G(s) = k\frac{s+a}{s^2} = \frac{b_1 s + b_0}{s^2} \quad (3)$$

where $b_1$ and $b_0$ are positive constants that may depend on the vehicle parameters and operating conditions. For example, using typical vehicle parameter values mentioned above, the model may be expressed as:

$$G(s) = 2.1276\frac{s+1.7497}{s^2}$$

Figure 3:
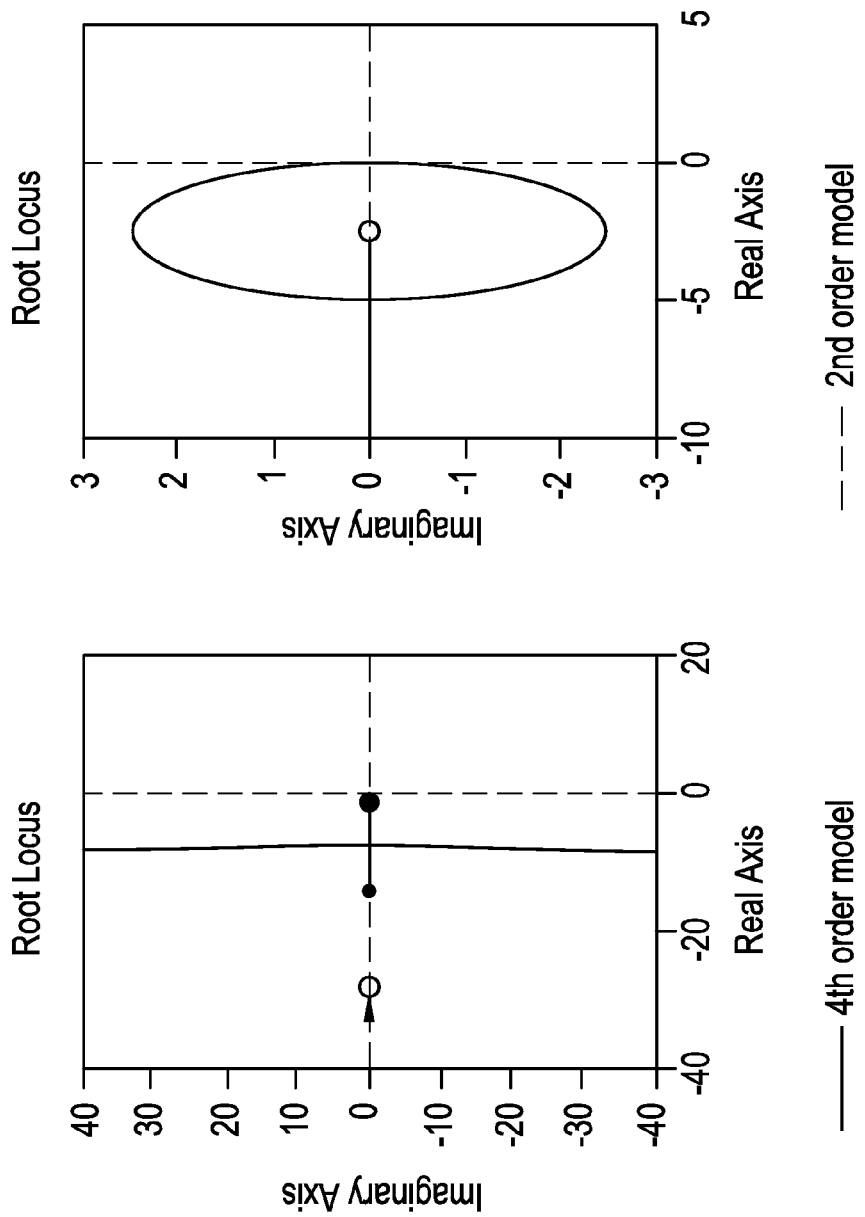

A root locus plot of a typical fourth order model and a root locus plot of the simplified second order model are depicted and compared in FIG. 3.

Figure 4:
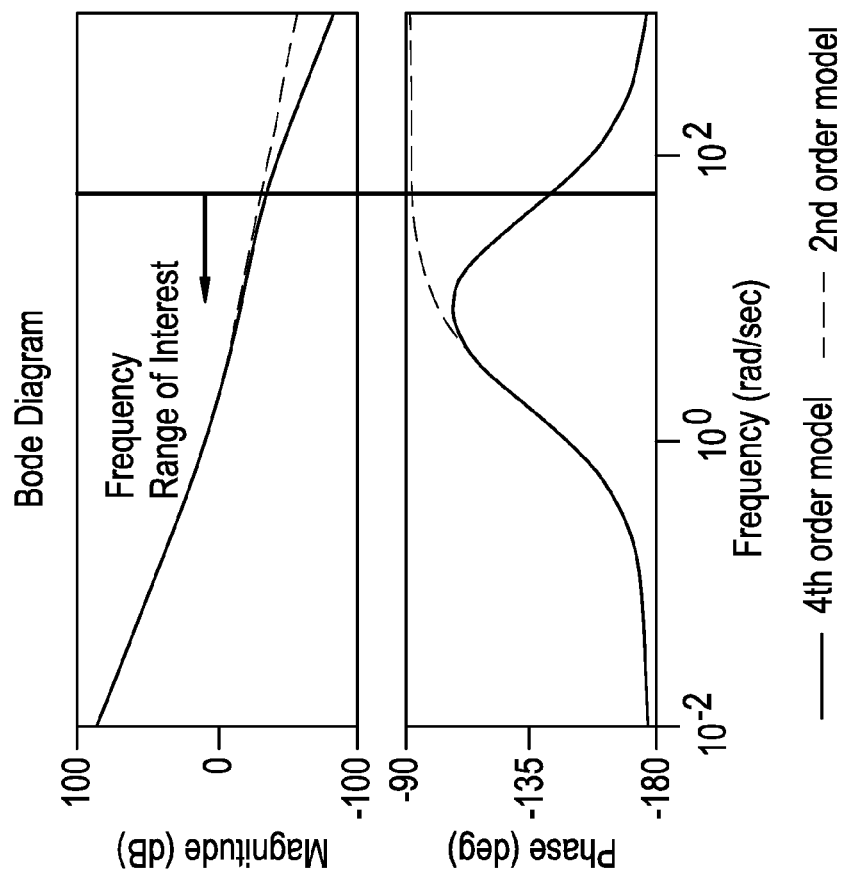

The Bode plot comparison of the fourth order model from (2) and the second order model from (3) is shown in FIG. 4. From the plots, it can be seen that the second order model is representative of the fourth order model for low frequency operations.

Method for Controlling According to at Least One Example Embodiment

Figure 5:
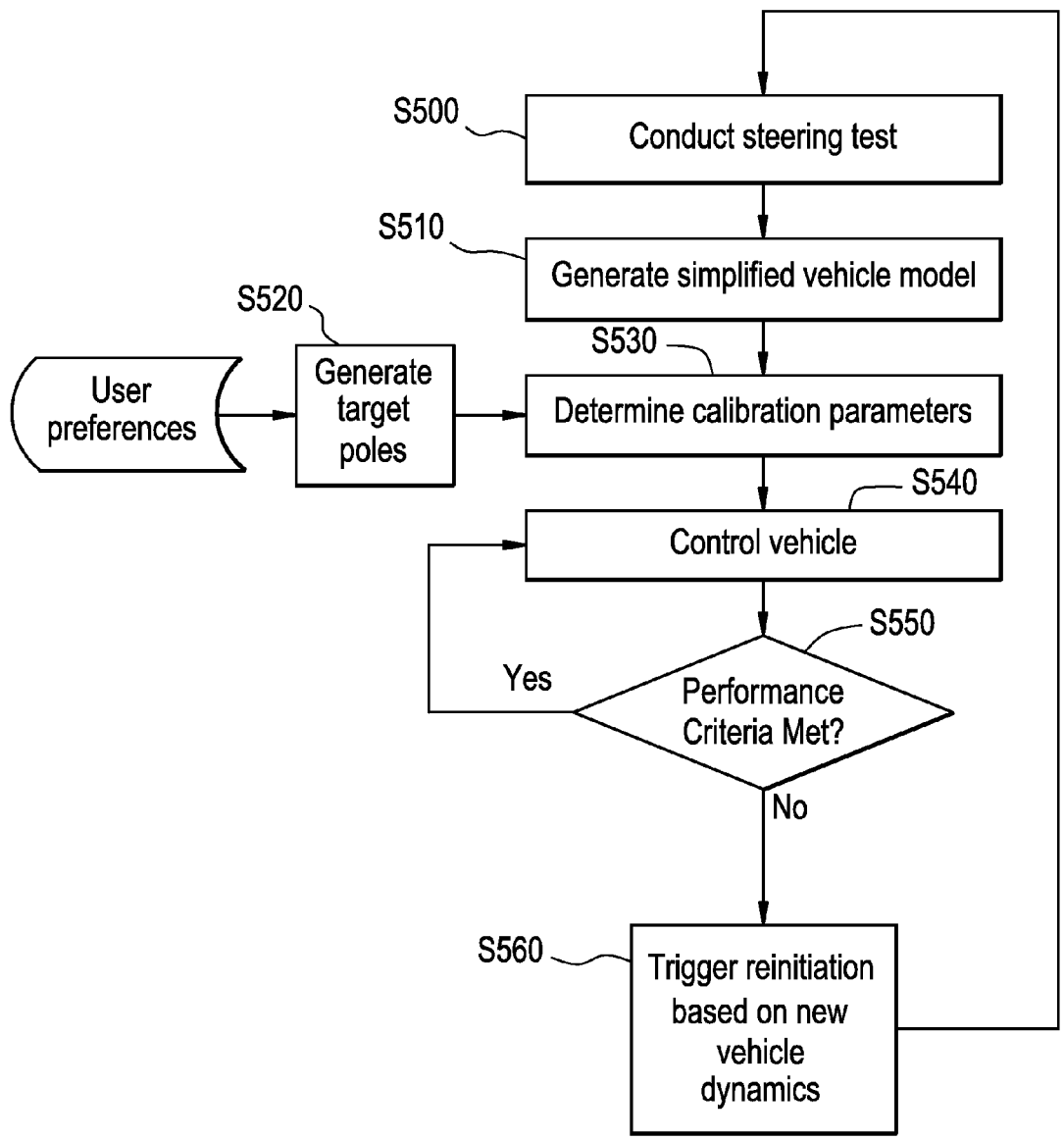

In at least one example embodiment, the controller 20 controls an automated steering system for an off-road vehicle, for example, by implementing a method illustrated in FIG. 5.

Identifying the Vehicle Model

In step S500, steering tests are conducted. A depiction of a steering test is shown in FIG. 6.

Figure 6:
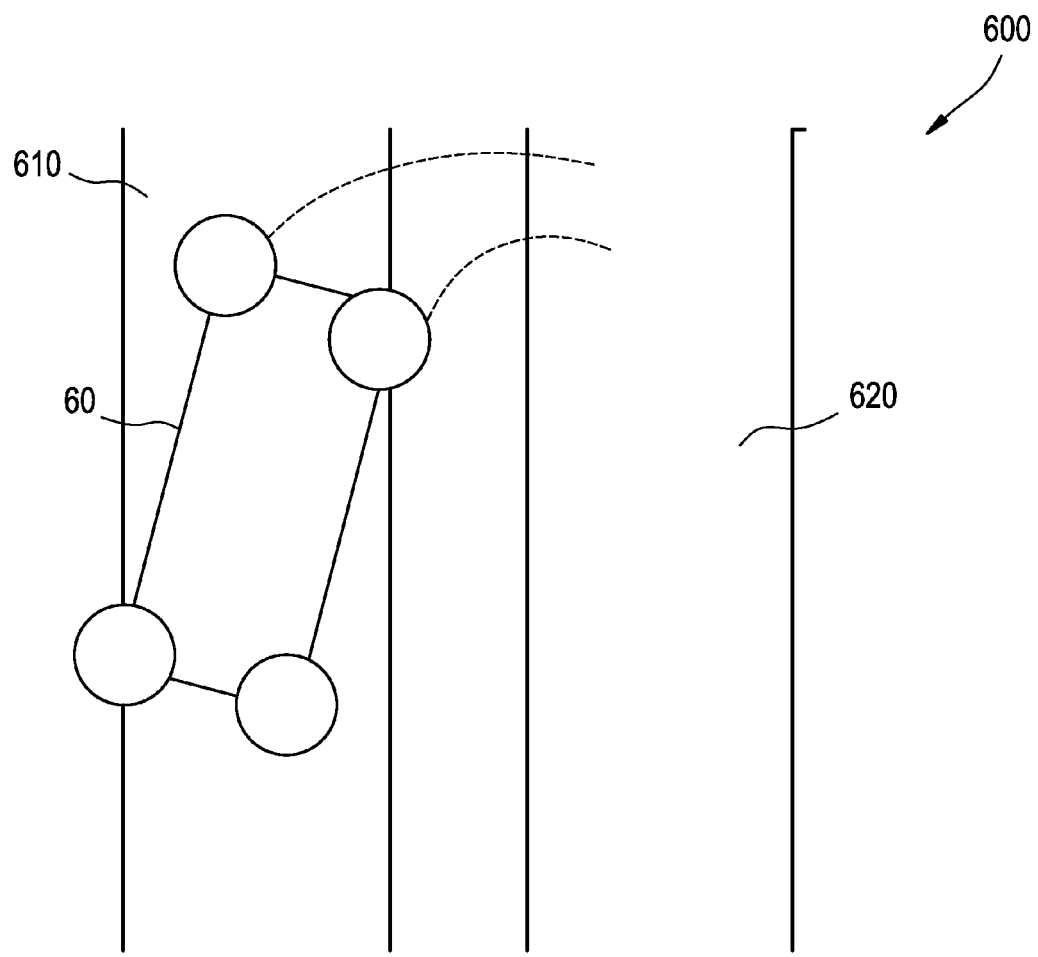

Referring to FIG. 6, the steering test may include steering vehicle 60 in a defined course in a work area 600. The course includes changing from a first path 610 to a second path 620, where the first path 610 and the second path 620 are spaced apart laterally.

Figure 7:
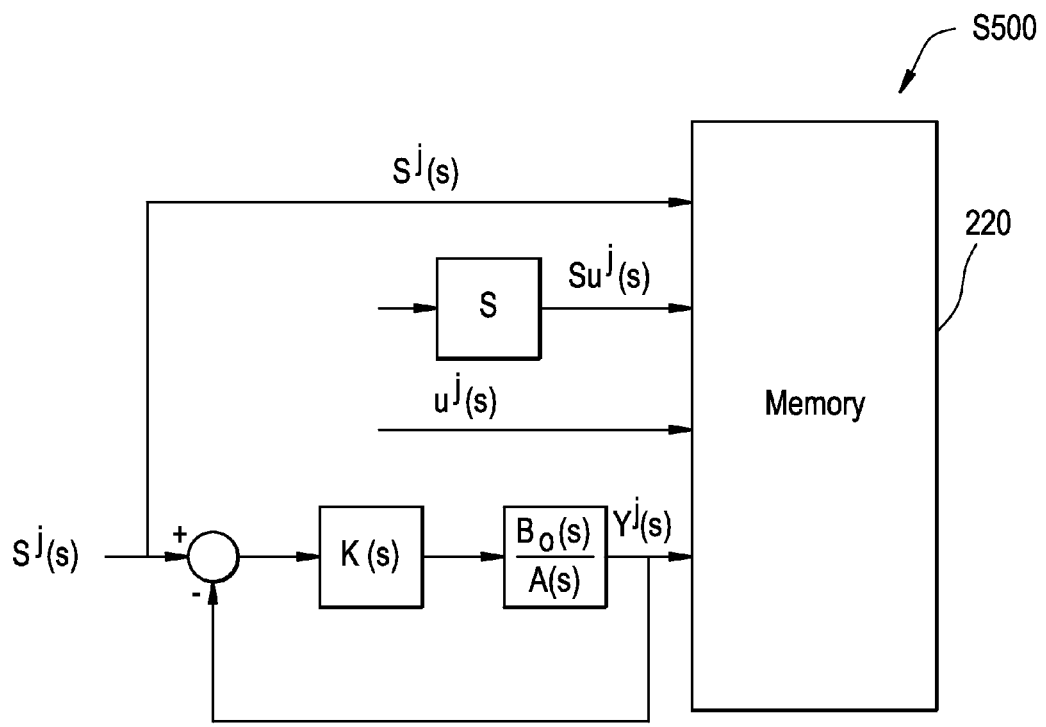

The control architecture for the steering test S500 is described with respect to FIG. 7.

Referring to FIG. 7, the processor 210 chooses a reference signal s(s). In an example embodiment, s(s) is a step lateral signal with amplitude of, for example, 3 meters, equivalent to a crop row change such as would occur during a steering test described with respect to step S500 and FIG. 6. At a j-th iteration of the steering test of step S500, the processor 210 injects the reference signal Sj(s) into the closed loop architecture shown in FIG. 7.

The block K(s) corresponds to the compensator of the steering control system for controlling lane changes during the steering tests of step S500.

In example embodiments, the steering test provides, for example, measurements of at least one steered wheel angle $u^j(s)$ provided by at least one wheel angle sensor 70 and at least one tractor lateral position $y^j(s)$ provided by the location-determining receiver 50. The processor 210 captures values during the steering test of step S500 and writes the values to memory 220. The reference signal Sj(s) may be the same as the step lateral signal s(s) discussed above.

The transfer function block $$\frac{B_0(s)}{A(s)}$$

in FIG. 7 represents the true plant or the true (actual) vehicle response. Inclusion of the transfer function block in FIG. 7 illustrates that, during the steering tests in the field 600, the processor 210 measures and records true values of u(s), i.e., the steering angle, and the actual response y(s), i.e., the vehicle lateral position. The processor 210 therefore writes captured values for steering angle u(s), steered wheel angle rate $su^j(s)$ and lateral position y(s), captured during the steering test, to memory 220.

The processor 210 uses the actual measurement data, taken during the steering test of step S500 and stored in the memory 220, in subsequent steps illustrated in FIG. 5, described below. In particular, the processor 210 uses the measurement data in the ILI algorithm step S510, described below, to generate a simplified vehicle model. Step S510 performs system identification, in other words, in step S510, the processor 210 fits a mathematical model to the actual measurement data in order to perform a system identification.

Referring again to FIG. 5, in step S510, the processor 210 generates a simplified vehicle model by identifying estimates of $b_1$ and $b_0$ from the model of Equation (3), through an iterative learning process known as Iterative Learning Identification (ILI).

Consider a transfer function relating the input and output signals:

$$y(s) = \frac{B^0(s)}{A(s)}u(s) = \frac{b_0^0 + b_1^0 s}{s^2}u(s) \quad (4)$$

where $b_0^0$ and $b_1^0$ are the unknown true parameters of the system, whose values are to be estimated. For the agricultural vehicle tested, the steered wheel angle is u(s) and the tractor lateral position is y(s). The denominator and numerator of the system at the j-th trial are defined as:

$$A(s) = s^2$$

and $$\hat{B}_j(s) = \hat{b}_0^j + \hat{b}_1^j s \quad (5)$$

As previously described, identification of a vehicle model allows the control system to take into account varying vehicle configurations, soil conditions, etc., for better performance of vehicle auto-guidance systems. The goal of the iterative learning process of step S510 is to find acceptable estimates of $B^0(s)$, expressed in Equation (4), based on the measurements of the input and output data.

The system denominator A(s) is known and therefore fixed at all trials. $\hat{B}^j(s)$, on the other hand, will be updated at each trial. The unknown parameter set at the j-th trial is $$\hat{\gamma}^j = [\hat{b}_0^j, \hat{b}_1^j]^T \quad (6)$$

The values of the parameter set $\hat{\gamma}^j, \hat{b}_0^j, \hat{b}_1^j$, are then used in Equation (5) to determine the estimator $$\frac{\hat{B}^j(s)}{A(s)},$$

which is the estimated plant model from the j-th trial. As stated above, the goal of the ILI process is to find the real (non-estimated) plant model, and because A(s) is known the final goal will find the real (non-estimated) $B^j(s)$. Step S510 is described in further detail below with regard to FIGS. 8 and 9.

Figure 8:
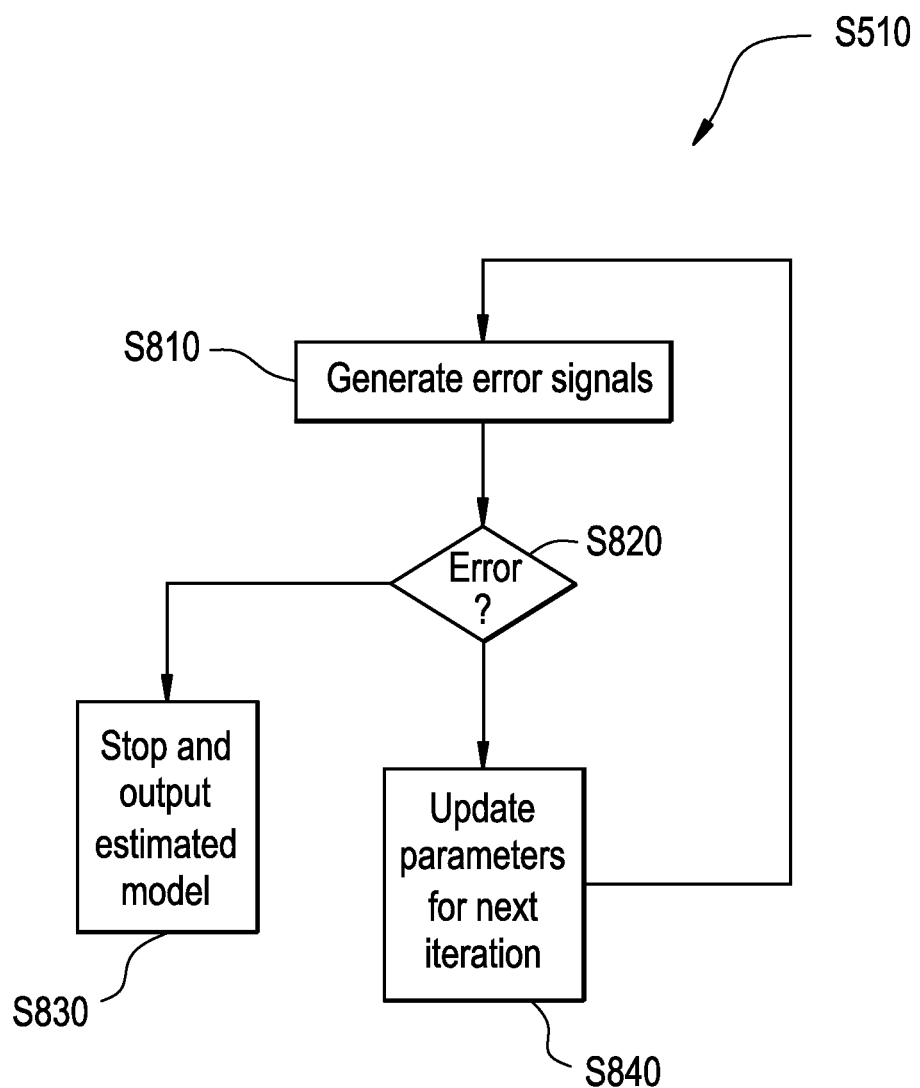
Figure 9:
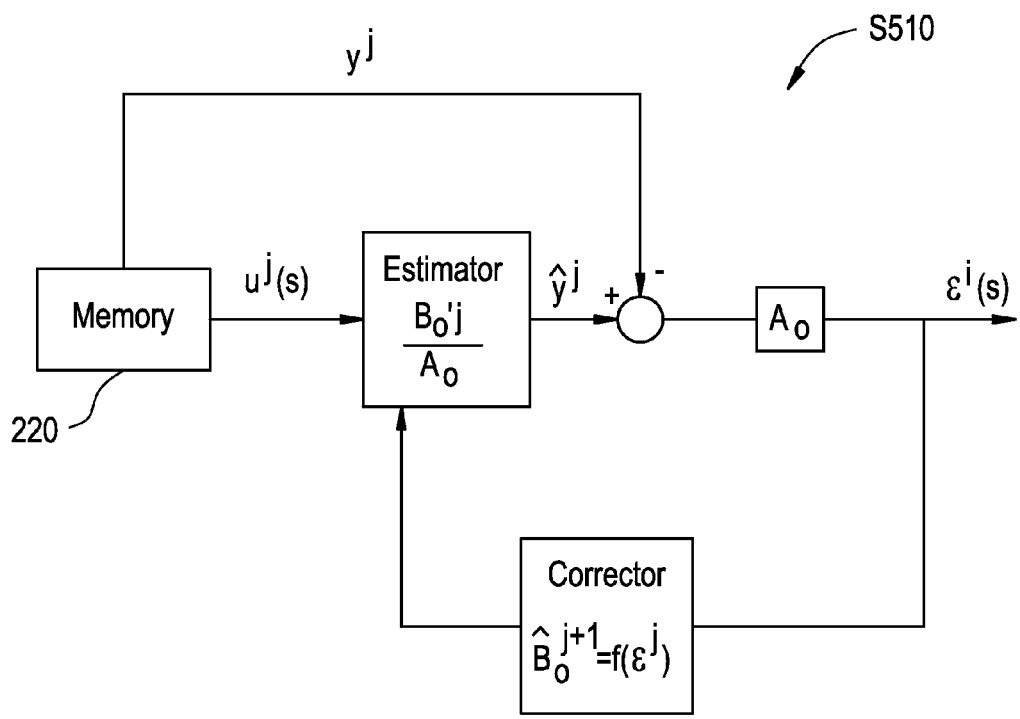

Referring to FIG. 8, in at least one example embodiment, the processor 210 calculates, in step S810 error signal $e^j(s)$ reflecting the errors between the estimated and measured values of B0(s) using the closed loop architecture according to FIG. 9. The error signal $e^j(s)$ is generated if the estimation of $\hat{B}^j(s)$ is known.

In FIG. 9, uj(s) and yj(s) are steered wheel angle and vehicle lateral output measurements, respectively, recorded during the steering test corresponding to the j-th trial in step S500 and stored in memory 220. When the measured steered wheel angle u(s) is injected into the estimated plant model, the result is an estimated output $\hat{y}(s)$. A0 is the known denominator of the plant model. The error signal, $e^j(s)$, is from the S810 step in FIG. 8. The corrector function updates the coefficients of $\hat{B}_{j+1}(s)$ for the next iteration based on the current iteration's coefficients, $\hat{B}^j(s)$ and the error signal $e^j(s)$.

The error signal $e^j(s)$ is obtained in step S810 according to FIG. 8:

$$e^j(s) = [\hat{y}^j(s) - y^j(s)]A(s) \quad (7)$$

Referring again to FIG. 8, if the estimation error determined at step S820 is less than the required threshold, the processor 210 outputs the simplified vehicle model in S830 as set forth in Eq. (4) in at least one example embodiment. In at least a further example embodiment, the criterion for outputting the simplified model may be based on the number of iterations attained. In at least a further example embodiment, the criteria may be a combination of the estimation error being below a threshold and a certain number of iterations being executed.

If the error is determined at step S820 to exceed a threshold, a parameter update law and learning gain must be used to update, in step S840, the estimated parameters $\hat{\gamma}^j = [\hat{b}_0^j, \hat{b}_1^j]^T$ for a next iteration.

A parameter update law for updating the estimated parameter set $\hat{\gamma}^j$ may be expressed as:

$$\hat{\gamma}^{j+1} = \hat{\gamma}^j + H\delta^j \quad (8)$$

where $\delta^j$ is a projection of $e^j$ onto a finite-dimensional subspace, which has the same dimension as the unknown parameter set $\hat{\gamma}^j$, and H is a learning gain.

The learning gain H is given by:

$$H = k*M^{-1}, (k<1) \quad (9)$$

where k determines the convergence speed, and $$M = U^T[G_s(s)K(s)s(s)s(G_s(s)K(s)s(s)]$$

The matrix M can be estimated without knowing the dynamics of the feedback control algorithm, and this must be done prior to the ILI procedure. Using the same reference signal s(s) discussed above with regard to the ILI procedure, the measured system input, or the steered wheel angle u(s) is given by:

$$u(s) = \frac{K(s)}{1 + K(s)\frac{B^0(s)}{A(s)}} s(s) = G_s K(s) s(s) \quad (10)$$

Taking the derivative of the input signal u(s) in the Laplace domain results in $$su(s) = \frac{sK(s)}{1 + K(s)\frac{B^0(s)}{A(s)}} s(s) = s G_s(K(s) s(s)) \quad (11)$$

From Equations (10) and (11), the two unknown terms in matrix M are estimated over the time window [0,T]. Thus, the learning gain H can be determined based on the estimated M matrix.

The processor 210 uses the parameter update law Eq. (8) and learning gains in step S840 to calculate new estimates $\hat{\gamma}^j = [\hat{b}_0^j, \hat{b}_1^j]^T$ for the next iteration of the ILI process, and control resumes with step S810 using these new estimates.

Determining Target Closed Loop Response and Placing Closed Loop Poles

Referring again to FIG. 5, the processor 210 determines desired closed-loop pole locations in step S520, to be implemented based on the limitations of the tractor system 10. It will be understood, however, that in example embodiments step S520 may occur separately from steps S510, S530 and S540. In example embodiments, step S520 may occur in advance of steps S510, S530 and S540.

The processor 210 implements a composite control system comprising the simplified vehicle model identified in step S510 and a feedback control algorithm. The feedback control algorithm may be the same as the feedback control algorithm K(s) described above regarding FIG. 7 in one example embodiment. In a further example embodiment, the feedback control algorithm may be different. In at least one example embodiment, the feedback control algorithm may share a similar structure to the structure of the feedback control algorithm K(s), but with different control gains or calibration parameters. In a non-limiting example embodiment, the feedback control algorithm is implemented as a lead/lag compensator.

As is known, the location of poles in a control system determines the stability and performance of the resulting control system. As is also known, certain limitations may be imposed on the control system based on parameters of the tractor system 10. The processor 210 takes these limitations into account when the processor 210 determines desired closed loop pole locations in step S520 (or generates target poles). Step S520 is described in detail with respect to FIG. 10.

In step S1000, the processor 210 receives a set of transient response specifications representing limitations of the tractor system 10. For example, there may be system delays, or slow sampling rates imposed by constraints of data buses within the system 10. These limitations may affect closed loop performance. A typical set of transient response specifications may include settling times and overshoot. In an illustrative example, an example embodiment may exhibit a settling time $t_s$ of 10 sec, and a maximum percentage of overshoot $M_p$ of 10%. These may be expressed as shown below:

$$t_s = \frac{4}{\zeta w_n} \text{ (2\% criteria)} \qquad (22)$$

$$M_p = e^{-\left(\zeta/\sqrt{1-\zeta^2}\right)\pi} \qquad (23)$$

where $\xi$ is the system damping ratio and $w_n$ is the system natural frequency. The processor 210 calculates the locations of desired closed loop poles S520 based on these specifications.

As discussed previously with regard to step S510, the vehicle dynamics model is a second order transfer function. As an illustrative example, according to example embodiments, the processor 210 may implement a first-order control algorithm with one closed loop pole. Therefore, the composite system includes three closed loop poles. The processor 210 calculates S1010 the two dominant (i.e., lower-frequency) closed loop poles based upon the specifications, shown for example in Equations (22) and (23). The processor 210 determines S1020 one non-dominant pole. If the non-dominant pole is not specified, the location of this non-dominant pole may negatively affect the overall system performance. In an example embodiment, the non-dominant pole is placed at a position that is 5 times faster than the dominant closed loop poles. Based on the example specifications set forth in Equations (22) and (23), the target dominant closed loop poles according to an example embodiment are placed at $$s_{1,2} = -0.4 \pm 0.5458i \qquad (24)$$

The non-dominant closed loop pole should be placed at $$s_3 = -2 \qquad (25)$$

In at least one example embodiment, the processor 210 may also receive in step S1030 user preference criteria and adjust the target poles based upon these preferences. In example embodiments, a user may, for example, prefer a more aggressive response. In an example embodiment, the user may indicate that fast response time is relatively more important to the customer than smoother steering, or vice versa. Based upon this criterion, the processor 210 may, for example, empirically decrease (override) the specified target settling time used to compute desired pole locations. As another non-limiting example, the processor 210 may compute pole locations for nominal performance specifications and empirically adjust the resultant target pole locations. As a still further non-limiting example, the processor 210 may retain the nominal settling time, the resulting nominal target pole locations, and the resulting nominal gain values that result in poles being placed at the nominal target location, but empirically adjust the resultant gains before use in the steering controller. It should be understood, however, that these are only three possible examples.

The relationship between the location of pole in s-plane and z-plane is illustrated in Eq. (26), where s denotes the pole location in s-plane, and $T_s$ denotes the sampling rate.

$$z = e^{sT_s} \qquad (26)$$

Thus, the processor 210 calculates in step S1040 desired closed loop pole locations in z-plane using Equation (26).

Referring again to FIG. 5, the processor 210 determines in step S530 calibration parameters to place the composite system poles at the target closed loop pole locations calculated in step S520.

In at least one example embodiment, the processor 210 places the closed loop poles at the target closed loop pole locations by solving closed loop characteristic equations. It should be understood that other example embodiments may use different methods including but not limited to, for example, root locus design and the state space method. Step S530 is described in detail with respect to FIG. 11.

Figure 11:
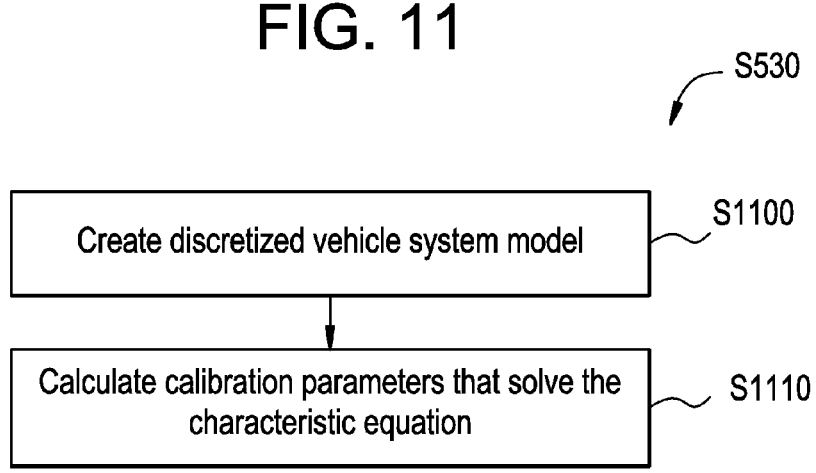

In step S1100 of FIG. 11, the processor 210 discretizes the vehicle system model as describe below with respect to Equations (27)-(30). In an illustrative embodiment, as stated above, the composite system includes the identified simplified vehicle model, and a control algorithm, the control algorithm being for example a lead/lag compensator. Assume a lead/lag compensator can be denoted by the following expression:

$$K(z) = \frac{k_1 z - k_2}{z - k_3} \qquad (27)$$

There are three unknown parameters in the compensator, $k_1$, $k_2$, $k_3$. The identified vehicle system model described previously may be expressed as:

$$G(s) = \frac{b_1 s + b_0}{s^2} \qquad (28)$$

The processor 210 uses zero-order hold (ZOH), for example, to transform the design from Laplace domain to z-domain, and Equation (29) shows the transformation:

$$G(z) = (1 - z^{-1})Z\left\{\frac{G(s)}{s}\right\} \qquad (29)$$

where $$Z\left\{\frac{G(s)}{s}\right\}$$

is the shorthand expression for $$Z\left\{L^{-1}\left\{\frac{G(s)}{s}\right\}\right\}$$

and $Z\{\cdot\}$, $L\{\cdot\}$ denote the z and Laplace transforms respectively. By applying the transform shown in Equations (28) and (29), the discretized vehicle system model can be written as:

$$G(z) = \frac{b_{z1} z - b_{z0}}{z^2 - 2z + 1} \qquad (30)$$

Combining equations (27) and (30) using block diagram reduction for the closed loop results in the composite closed loop system transfer function depicted in Equation (31) and also referred to more generically as the composite system.

$$\frac{(k_1 z - k_2)(z^2 - 2z + 1)}{(z^2 - 2z + 1)(z - k_3) + (b_{z1} z - b_{z0})(k_1 z - k_2)} \qquad (31)$$

The model of equation (31) is used to calculate the control system gains for the controller 20 on the vehicle system 10. As is known, the gain is equivalent to a sensitivity of a control system. For large gains, a large correction is generated for a given error. Conversely, for small gains, a small correction would be generated for a given error. As discussed previously, therefore, the gain of the controller may be adjusted based on a user preference to obtain more or less sensitive steering controls.

In at least one example embodiment, a desired vehicle trajectory is provided by a field map. The field map is incorporated in the user display 40 in at least one example embodiment. GPS system 50 provides a true position of the vehicle. Based on the true position and desired position, a tracking error is input to controller 20, and depending on the gain provided by Equation (30), corrections are made by controlling the steering of the steering mechanism 30. The input to controller 20, used for steering control, are the tracking errors between the desired and actual trajectory. Thus, from Equation (31), the closed loop characteristic equation is:

$$(z^2 - 2z + 1)(z - k_3) + (b_{z1} z - b_{z0})(k_1 z - k_2) = 0 \qquad (32)$$

The desired characteristic equation calculated based on the locations of desired closed loop poles can be written as:

$$(z - z_1)(z - z_2)(z - z_3) = 0 \qquad (33)$$

To place the closed loop poles at the desired locations, the processor 210 calculates calibration parameters S1110 that solve the characteristic equation by setting Equation (32) equal to Equation (33). As can be seen, this will result in three equations with three unknown variables, $k_1$, $k_2$, $k_3$, and the solution should be unique. This type of solution requires the least computational cost. The calculated calibration parameters therefore create a closed loop control system with poles placed at the desired pole locations to meet the performance criteria. Placing these calibration parameters into equation (27) results in the steering control transfer function also referred to more generically as the steering control system.

Figure 10:
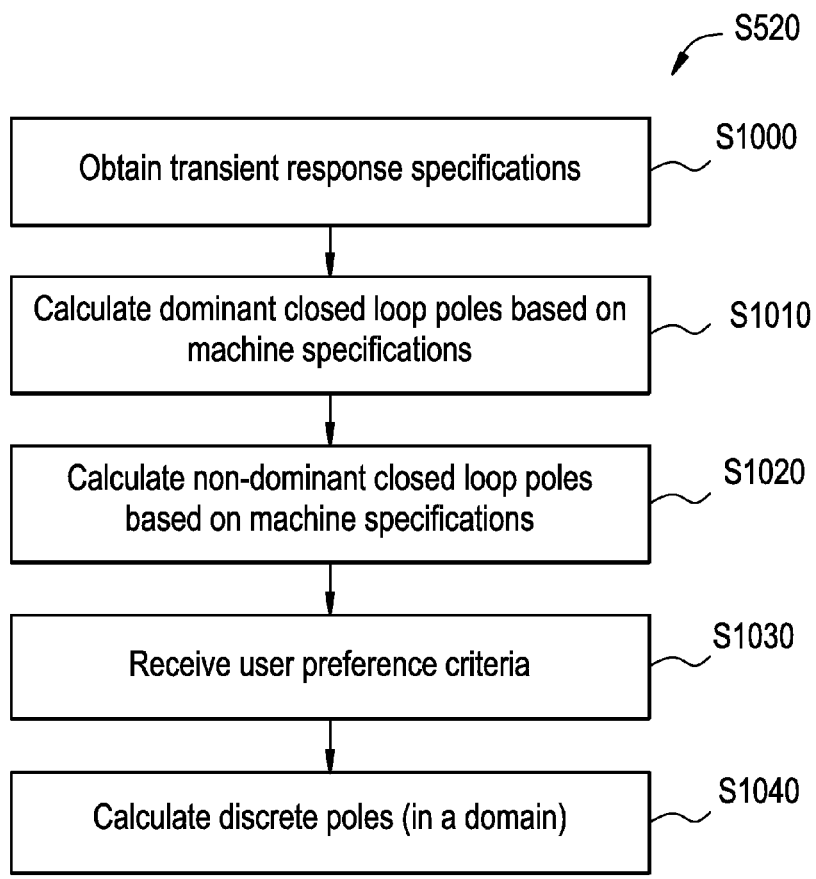

In one embodiment, the performance criteria may include, for example, a target settling time and a target maximum overshoot, as previously described with regard to FIG. 10. In example embodiments, performance criteria may further include target standard deviations for lateral position error and heading angle error. In example embodiments, the performance criteria are satisfied if an observed settling time is less than or equal to the target settling time and an observed maximum overshoot is less than or equal to a maximum target overshoot.

In example embodiments, the evaluation process and the vehicle model identification includes steering vehicle 60 on a track in a defined work area, as described above with respect to FIG. 6.

The evaluation process may further evaluate at least an aggregate lateral position error of the steering and an aggregate heading angle error of the steering.

In at least one example embodiment, the evaluating may include determining, by a location-determining receiver 50, a plurality of pairs of actual observed positions and corresponding observed headings of the vehicle along the defined course in the work area. In example embodiments, the processor 210 may then determine a lateral position error between each of the actual observed positions and a corresponding target position on the course. The processor 210 may further determine each heading angle error of the vehicle 60 between each of the actual observed heading angles and a target heading angle of the vehicle 60 on a course. The processor 210 may then estimate an aggregate lateral position error based on the determined lateral position errors. The processor 210 may estimate an aggregate heading error based on the determined errors.

Referring again to FIG. 5, vehicle operation continues based on the developed steering control system in step S540. Recall that in at least one example embodiment, a GPS system 50 provides the position of the vehicle referenced to a field map. Comparing the position measurement to the desired position along a trajectory specified in the field map results in the tracking error. Namely, obtaining a difference between the two results in the tracking error TE. The processor 210 determined the steering angle u, for example, according to Equation (34) below.

$$u = TE * K(z) \qquad (34)$$

where $K(z)$ is the steering control system (e.g., equation (27) with the calibration parameters plugged in.

The processor 210 controls the vehicle by outputting steering commands to the steering control 240 to obtain the determined steering wheel angle. It should be noted that as the vehicle 60 is operating based on the controls of step S540, the user may change user preferences and control may revert to step S520 as shown in FIG. 5.

At any point in the operation of step S540, dynamic response of the vehicle 60 may be changed and the vehicle operator may subjectively determine in step S550, in at least one example embodiment, whether criteria are still being met. In illustrative examples involving the operator, if the operator changes an implement attached to the vehicle 60 for example, or if the operator indicates changing soil conditions for example, the operator indicates that vehicle dynamics have changed in step S550, re-initiation is then triggered based on new vehicle dynamics in step S560 and the steering tests of S500 are then performed again so that system dynamics may be re-learned.

In at least another example embodiment, the processor 210 may determine, in step S550, whether performance criteria are still being met. After a determination that performance criteria are not being met in step S550, the processor 210 in step S560 triggers re-initiation of the process starting at step S500.

In either event, starting at step S500, the steering tests then take place again to capture new measurement data under the new vehicle dynamics. The processor 210 uses the new measurement data in step S510, described previously, to fit a mathematical model to the new measurement data to perform an updated system identification. The processor 210 then determines calibration parameters for the controller 20 in step S530. The vehicle 60 will then be controlled in step S540 under the updated determined control parameters.

In an example embodiment, the calibration process herein described may be initiated based on a user request to perform a calibration procedure. An example embodiment may also be initiated based on the installation of a control system 20 in a vehicle 60, for example a steering control system.

In example embodiments, the processor 210 provides control based on the tracking error. However, it will be appreciated that the control system may be derived according to the above described embodiments for control based on other forms of input instead of tracking error.

In example embodiments, the processor 210 provides control for a steering system. However, it will be understood and appreciated that other vehicle control systems may be derived according to the above described embodiments for other types of vehicle systems. As discussed above, the inventors have developed the above model taking into account that simplified models may be possible for certain off-road vehicles. Example embodiments enable the possibility of simpler calculations of control algorithm gains, in turn enabling control computations to be undertaken in relatively small control units in real-time on a vehicle system. As will be understood, example embodiments provide for a better control system that may adjust for vehicle parameters, soil conditions, etc., through definition of a vehicle model, identified in an iterative learning process.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method for calibrating control parameters of an off-road vehicle system, the method comprising:
   identifying a reduced-order vehicle model, the reduced-order vehicle model representing a vehicle transfer function in which at least one high-frequency pole is removed;
   generating target closed loop pole locations based on at least one user preference parameter;
   determining calibration parameters that place closed loop poles of a composite system at tile target closed loop poles, the composite system including the reduced-order vehicle model mad a vehicle control system;
   controlling the off-road vehicle using tile vehicle control system configured using the calibration parameters;
   evaluating the performance of the vehicle control system based on at least one performance criterion;
   updating the reduced-order vehicle model based on the evaluating; and
   determining updated calibration parameters based on the updated reduced-order vehicle model.

2. The method of claim 1, wherein the reduced-order vehicle model includes two poles.

3. The method of claim 1, wherein the method is initiated based on user input.

4. The method of claim 1, wherein the method is initiated based on initial installation of the vehicle control system.

5. A vehicle control system comprising:
   a processor and an associated memory, the processor configured to,
   identify a reduced-order vehicle model, the reduced-order vehicle model representing a vehicle transfer function in which at least one high-frequency pole is removed,
   generate target closed loop pole locations based on at least one user preference parameter, and
   determine calibration parameters that place composite system dosed loop poles at the target closed loop poles, the composite system including the reduced-order vehicle model and a vehicle control system;
   a device configured to control a function of the vehicle using the vehicle control system, the vehicle control system being based on the determined calibration parameters;
   evaluate the performance of the vehicle control system based on at least one performance criterion;
   update the reduced-order vehicle model based on the evaluating; and
   determine updated calibration parameters based on the updated reduced-order vehicle model.

6. The system of claim 5, wherein the reduced-order vehicle model includes two poles.

7. The system of claim 5, wherein the processor is further configured to:
   receive a user input indicate acceptance of performance of the vehicle control system.

8. The system of claim 5, wherein the performance criteria include at least a settling time and a maximum overshoot of the reduced-order vehicle model.

9. A non-transitory tangible storage medium including program segments for, when executed on a computer device, causing the computer device to implement the method for calibrating control parameters of an off-road vehicle system, the method comprising:
   identifying a reduced-order vehicle model, the reduced-order vehicle model representing a vehicle transfer function in which at least one high-frequency pole is removed;
   generating target closed loop pole locations based on at least one user preference parameter;
   determining calibration parameters that place closed loop poles of a composite system at tile target closed loop poles, the composite system including the reduced-order vehicle model mad a vehicle control system;
   controlling the off-road vehicle using tile vehicle control system configured using the calibration parameters;
   evaluating the performance of the vehicle control system based on at least one performance criterion;
   updating the reduced-order vehicle model based on the evaluating; and
   determining updated calibration parameters based on the updated reduced-order vehicle model.

* * * * *